United States Patent [19]

Oliver

[11] Patent Number: 6,044,434

[45] Date of Patent: Mar. 28, 2000

[54] CIRCULAR BUFFER FOR PROCESSING AUDIO SAMPLES

[75] Inventor: Richard J. Oliver, Laguna Beach, Calif.

[73] Assignees: Sony Corporation, Japan; Sony Electronics, Inc., Park Ridge, N.J.

[21] Appl. No.: 08/937,140

[22] Filed: Sep. 24, 1997

[51] Int. Cl.[7] .................................................. G06F 12/00
[52] U.S. Cl. .............................. 711/110; 711/219; 700/94
[58] Field of Search .................................... 711/110, 219; 700/94

[56] References Cited

U.S. PATENT DOCUMENTS

| 5,450,544 | 9/1995 | Dixon et al. ............................. 711/110 |
| 5,606,707 | 2/1997 | Tomassi et al. ......................... 700/259 |

*Primary Examiner*—Jack A. Lane
*Attorney, Agent, or Firm*—Fulwider Patton Lee & Utecht, LLP

[57] ABSTRACT

A circular buffer in a system for processing audio samples wherein the buffer includes a sample window, the length of which is the length of a plurality of samples, the length of the circular buffer is a multiple of the length of the sample window, and the entire sample window is treated as a contiguous linear address space on each iteration of the processing system, that is moved through the physical multiple sample length buffer between iterations of the processing system, and is reset to the beginning every sample window number of iterations of the processing system. The circular buffer substantially reduces the number of address calculations in processing systems where every buffer position is addressed on every iteration and where circular addressing is not provided in hardware.

10 Claims, 4 Drawing Sheets

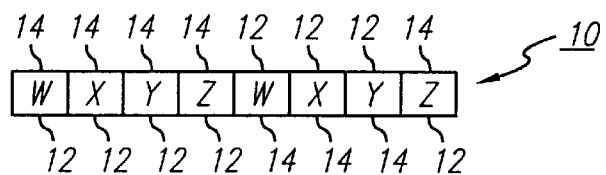
FIG. 1 INITIAL STATE
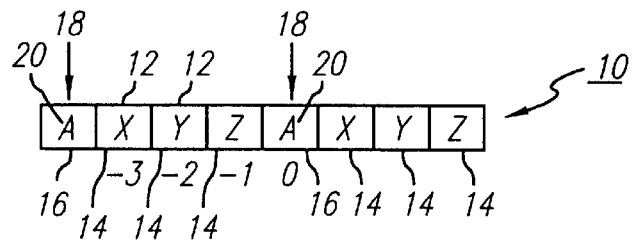
INPUT A
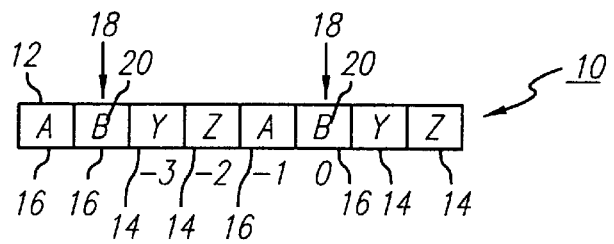
INPUT B
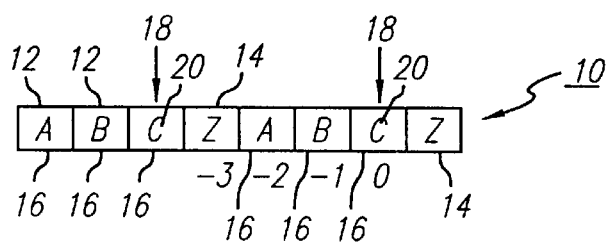
INPUT C
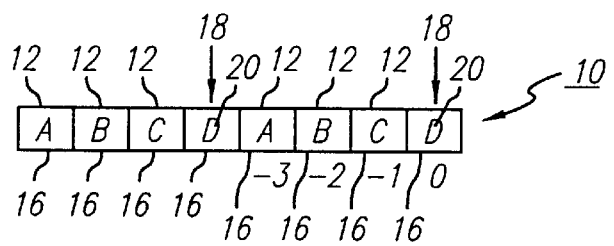
INPUT D FIG. 2
PRIOR ART
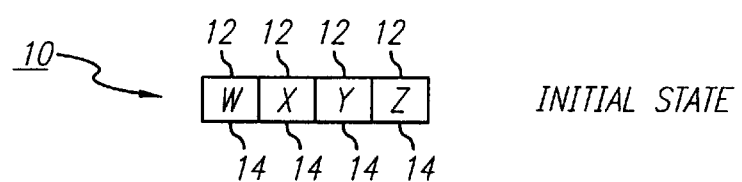
INITIAL STATE
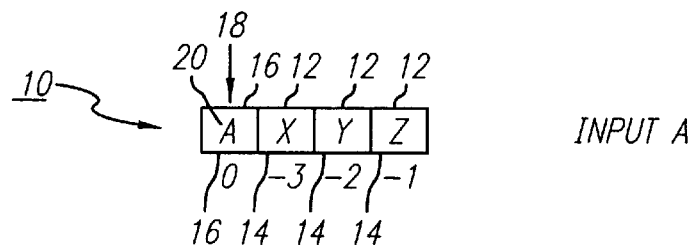
INPUT A
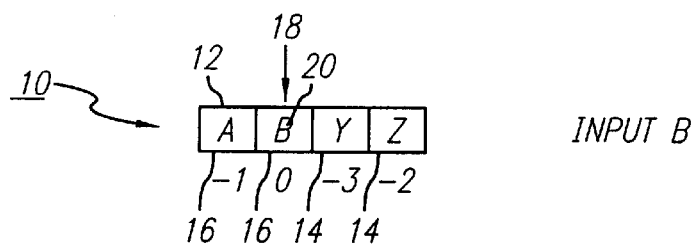
INPUT B
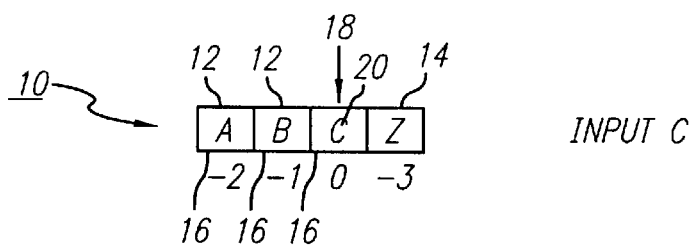
INPUT C
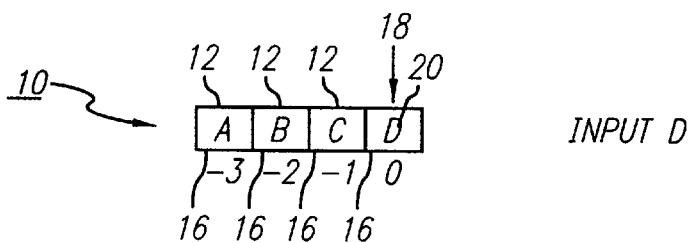
INPUT D

| NUMBER OF CIRCULAR BUFFER ADDRESS CALCULATIONS FOR EVERY FOUR SAMPLES PROCESSED | | |
|---|---|---|
| BUFFER LENGTH | 4 | 8 |
| INNER LOOP | 16 | 0 |
| OUTER LOOP | 8 | 4 |
| TOTAL | 24 | 4 |

CIRCULAR BUFFER FOR PROCESSING AUDIO SAMPLES

BACKGROUND OF THE INVENTION

1. Field of the Invention

The present invention relates generally to buffers. It relates more particularly to a fixed length circular buffer wherein samples are added at one end and samples are removed from the other end.

2. Art Background

Specialized filters generally require a buffer that holds the number of the most recent samples that have been passed through the system, where the number of the most recent samples is a fixed integer. Buffers of fixed length which add samples at one end and remove samples from the other end are known as circular buffers or ring buffers. Circular buffers have been implemented in hardware addressing systems in some digital signal processors, by special address registers, which address memory such that if the address pointer is at the end of the buffer and is incremented, instead of going to the next physical address it moves back to the beginning of the buffer. If the address pointer is at the beginning of the buffer, and is decremented, it automatically moves to the end.

However, the type of functionality available in hardware implemented buffers is not available in a general purpose processor or in a high level language.

Therefore, there has been a need existing for a system which is capable of providing the functionality of a hardware implemented buffer in a general purpose processor or high level language. The present invention fulfills those needs.

SUMMARY OF THE INVENTION

Briefly and in general terms, the present invention provides a system for implementing a circular buffer, where samples are added at one end and removed from the other end, without hardware implementation, by doubling the physical buffer length and inserting each new sample at two spaced apart positions.

The system includes a circular buffer for storing a plurality of audio samples during iteration of a system for processing audio samples, wherein a plurality of audio samples comprise an address. The length of the buffer comprises a multiple of the length of an address. The buffer includes first and second opposed ends, wherein an audio sample is added to multiple positions in the buffer upon each iteration of the processing system, and an audio sample is removed from multiple positions in the buffer after a plurality of iterations of the processing system. The system further includes means for adding an audio sample to the multiple positions in the buffer upon each iteration of the processing system, and means for removing an audio sample from the multiple positions in the buffer after a plurality of iterations of the processing system.

One aspect of the present invention is that the system implements a circular buffer which includes a sample window, the length of which is the length of a plurality of samples, wherein the length of the circular buffer is a multiple of the length of the sample window. The entire sample window is treated as a contiguous linear address space in each iteration of the processing system, that is moved through the physical multiple sample length buffer between iterations of the processing system, and is reset to the beginning every sample window length number of iterations of the processing system, substantially increasing the addressing efficiency of the system.

Another aspect of the present invention is that the number of address calculations for each iteration of the processing system is substantially reduced in systems where every buffer position is to be addressed on every iteration, such as specialized filtering, and where circular addressing is not provided in hardware.

Other features and advantages of the invention will become apparent from the following detailed description taken in conjunction with the accompanying drawings, which illustrate, by way of example, the features of the invention.

BRIEF DESCRIPTION OF THE DRAWING

FIG. 1 is a diagram illustrating a circular buffer in accordance with the present invention;

FIG. 2 is a diagram illustrating a circular buffer in accordance with the prior art;

DETAILED DESCRIPTION OF THE INVENTION

Figure 3:
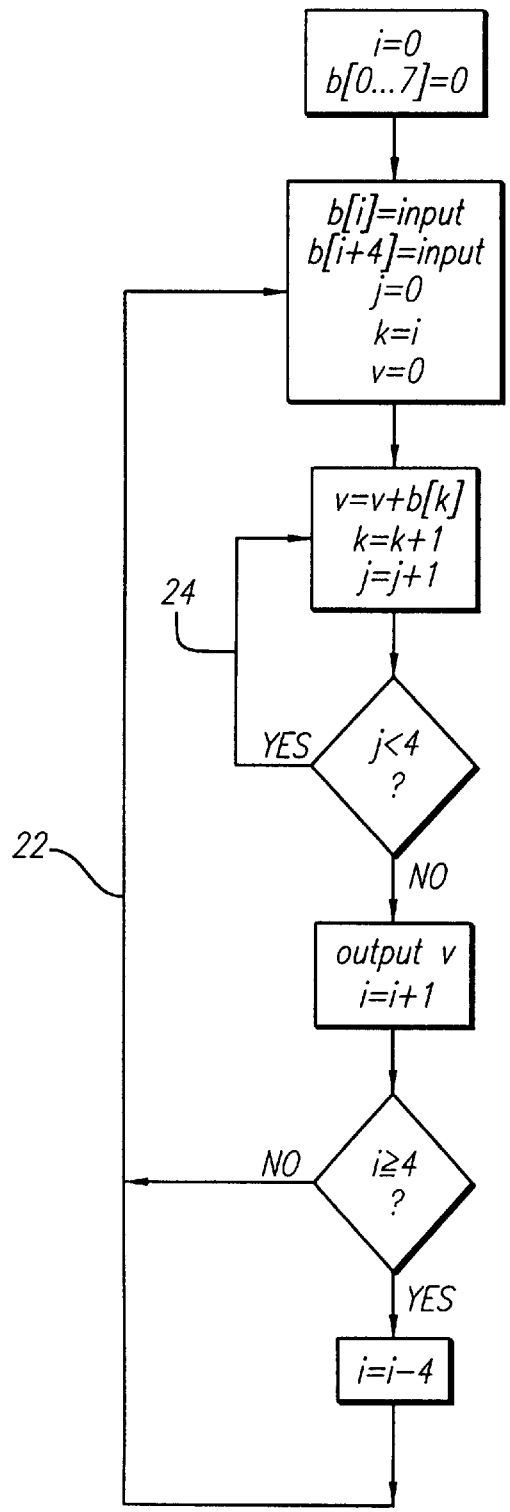
FIG. 3 is a flow chart illustrating the circular buffer in accordance with the present invention.

Referring now to the drawings, and in particular to the preferred embodiment of the invention in FIG. 1 and to the prior art in FIG. 2, there are shown a buffer 10 for a filter in a system for processing audio samples 12.

Buffer 10 includes a plurality of locations 14 for audio samples 12. Audio samples 12 include samples A, B, C, and D. In the invention embodiment in FIG. 1, there are eight locations 14, locations W, X, Y, Z, W, X, Y, and Z, whereas in the prior art in FIG. 2, there are four locations W, X, Y, and Z. Audio samples A, B, C, and D are input in buffer positions 16 as identified by the pointer arrow or arrows 18 above particular locations 14. Audio samples 12 currently in the filter are identified as current audio samples 20 and by the numbers 0, −1, −2, and −3 below particular locations 14.

In the embodiment of the invention shown in FIG. 1, for example, the size of the buffer is doubled to eight audio sample locations, W, X, Y, Z, W, X, Y and Z, and each audio sample A, B, C, and D is copied to two locations 14 in buffer 10.

In the prior art, as illustrated in FIG. 2, the size of buffer 10 is the same as the filter length, which is four audio samples 12, namely A, B, C and D. For a length of buffer 10 which is the same as the filter length, on each iteration of the filter, it is desired to access every sample 12 on buffer 10. In order to do that on a general purpose processor or the like, the address calculations would have to be checked while incrementing through buffer 10, and for each increment buffer 10 would have to be checked to make sure an audio sample 12 did not go past the end of buffer 10, and if it did then the pointer 18 would have to be wrapped back to the beginning.

As shown the example in FIGS. 1 and 2, buffer 10 starts in an initial state, and then there are four audio sample inputs 12, A, B, C and D, each input at a position or positions 16 in buffer 10 as indicated by pointer arrow or arrows 18 above the position or positions 16. In the FIG. 1 invention embodiment implementation, each audio sample 12 goes in at two positions 14, so that there is always a region in buffer 10, a linear contiguous address space, that doesn't cross the physical buffer boundary, which represents the four samples 12 that are currently in the filter, which positions 16 are identified as zero, minus one, minus two, and minus three. In the FIG. 1 invention embodiment implementation, the current filter samples 0 to −3 do not cross the buffer boundary. In the FIG. 2 prior art implementation, each audio sample 12 goes into buffer 10 at only one position 16. In the FIG. 2 prior art, the position of audio samples 12 in buffer 10 needs to be checked every iteration of the filter, since for each iteration of buffer 10, the buffer boundary is crossed, and only on each fourth iteration is the buffer boundary not crossed.

In the flow chart in FIG. 3 for the invention embodiment, there is only one decision required to check for an audio sample position going past the physical buffer end, specifically where j equals 4. Initially the input is 0, and buffer 10 is at 0. Each of the four inputs is then inserted at two buffer positions, with four checks at decision points in the outer loop where j is less than 4, and no checks in the inner loop, for a total of four checks. In particular, in the flow chart in FIG. 3 for the buffer in FIG. 1, initially a counter i for an outer loop 22 and valid input buffer index (0, 1, 2, 3) is initialized to 0, to initialize the loop counter at a valid buffer index at the beginning of buffer 10. An array b of the eight samples (0, 1, 2, 3, 4, 5, 6, 7) in buffer 10 is also initialized to 0. The next input sample is then input to current valid index input position b[i], and the input is mirrored at a second place in buffer 10, at the higher end of buffer 10 at valid index input position b[i+4], a loop counter j for an inner loop 24 is set to 0, and a convolution counter and valid buffer index k for inner loop 24 is set to i, to initialize k for inner loop 24. Then an accumulator V for calculating the output value of the filter is initialized to 0 at the beginning of outer loop 22. Next the value at b[k] is accumulated into V, which is the output value of the filter, k is incremented so that the next value can be accumulated as the index to the buffer in the next pass through inner loop 24, and j is incremented by 1 as the loop counter. Because buffer 10 has the mirrored input at b[i+4], no check of the value of k has to be made, since k is still a valid buffer address. Next a check is made to see if j<4, to check the loop condition to cycle the inner loop 24 four times which is a buffer wrap, modeling a circular buffer, even though the buffer is a linear buffer of eight samples. Inner loop 24 is then cycled four times, and when j gets to 4, all buffer 10 values have been accumulated into V, whereupon V is output as the output sample, and loop counter i is incremented by 1 to i+1. Next a check is made of outer loop counter i, to see if i≧4, and if it is, 4 is subtracted from i to model the circular buffer 10, and to continue through outer loop 22.

Figures 4, 5:
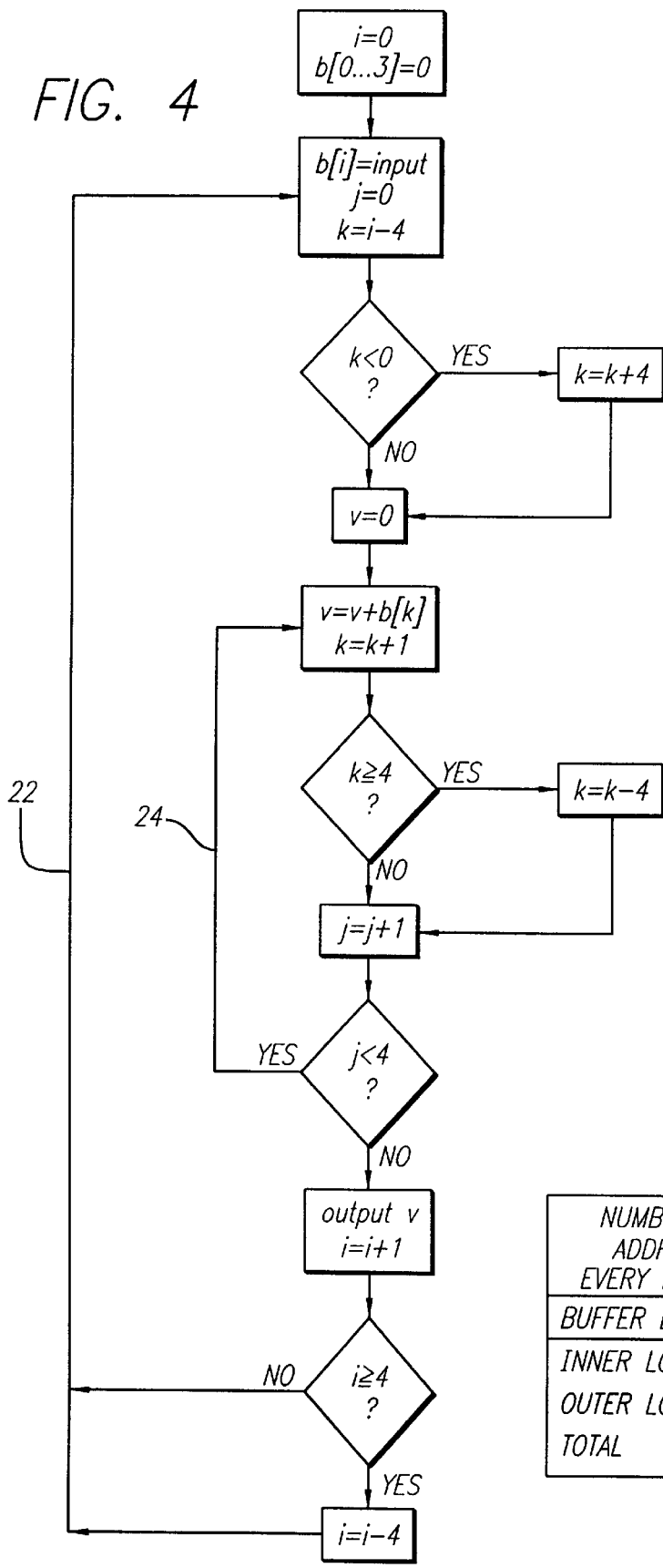
FIG. 4 is a flow chart illustrating the circular buffer in accordance with the prior art.
FIG. 5 is a table comparing the number of address calculations in accordance with the present invention and in accordance with the prior art.

In the flow chart in FIG. 4 for the prior art for example, decisions are required for the three values of j other than j less than 4, to check to see if the audio sample position has gone past the physical buffer end. Initially the input is 0, and buffer 10 is at 0. Each of the four inputs is then inserted at one buffer position, with eight checks at decision points in the outer loop where j is less than 4, and sixteen checks in the inner loop, for a total of twenty-four checks. In particular, in the flow chart in FIG. 4 for the prior art buffer in FIG. 2, initially a counter i for outer loop 22 and valid input buffer index (0, 1, 2, 3) is initialized to 0, to initialize the loop counter at a valid buffer index at the beginning of buffer 10. An array b of the four samples (0, 1, 2, 3) in buffer 10 is also initialized to 0. The next input sample is then input to current valid index input position b[i], a loop counter j for inner loop 24 is set to 0, and a convolution counter and valid buffer index k for inner loop 24 is set to look back one buffer length in buffer 10 and increment to where i is. Next a circular buffer address calculation is made to check if k<0. If so, an adjustment is made to set k=k+4, which is the buffer wrap, modeling a circular buffer, even though the buffer is a linear buffer of four samples. This check buffer wrap is required frequently in prior art buffer 10 in FIG. 2, but required infrequently in buffer 10 in FIG. 1. Then an accumulator V for calculating the output value of the filter is initialized to 0 at the beginning of outer loop 22. Next the output value of the filter is accumulated in accumulator V, then k is incremented so that the next value can be accumulated in the next pass through inner loop 24. Next a check is made to see if k≧4, since k has just been modified by incrementing it, to see if k is outside of the buffer range. If k≧4 then 4 must be subtracted from k to model the circular buffer. Next loop counter j is incremented by 1 to j+1. Next a check is made to see if j<4, to check the loop condition to cycle the inner loop 24 four times. Inner loop 24 is then cycled four times, and when j gets to 4, all buffer 10 values have been accumulated into V, whereupon V is output as the output sample, and loop counter i is incremented by 1 to i+1. Next a check is made of outer loop counter i; to see if i≧4, and if it is, 4 is subtracted from i to model the circular buffer 10, and to continue through outer loop 22.

For the invention embodiment in FIGS. 1 and 3, for a buffer length of eight audio samples, for every four audio samples processed, as shown in the right hand column in the table in FIG. 5 there are no address calculations for buffer boundary checks in the inner loop and only four address calculations for buffer boundary checks in the outer loop and in total, which is a substantial savings computationally and in performance over the prior art. For the exemplary prior art buffer where the buffer length is four audio samples, which would be iterated through four times, there is a buffer boundary address calculation check in the inner filter loop, which is an expensive calculation computationally and reduces system performance, resulting in 24 calculations, as shown in the middle column in the table in FIG. 5.

In systems which include a general purpose processor or high level language, and where there is access to a substantial amount of memory without access to hardware addressing, substantially increasing the size in memory of the buffer substantially reduces the processing time for computational calculation.

A functional description of the circular buffer of the present invention is included in the attached Appendix A.

While this invention has been particularly described with reference to a prepared embodiment thereof, it will be understood by one skilled in the art that the present system may be practiced without many of the specific details described above, and that changes in the above description or illustrations may be made with respect to form or detail without departing from the spirit and scope of the invention.

APPENDIX A

```
// NAME
//    rate.cpp
//
// DESCRIPTION
//    Interface to the AES reference time.
//
// COPYRIGHT
//    Copyright 1996 by Advanced Digital Systems Group, All rights reserved.
//
// VERSION CONTROL
//    $Header:  G:/PVCS/ARCHIVES/TPRTOLL/rate.cpv  1.23  Aug 15 1997 15:52:40  jclaar  $
// include "precomp.h"
include <rate.hpp> include <aesiface.hpp>
include <registry.hpp>
#include <regkeys.h>
#include <syminmax.hpp>
#include <textern.h>

//
// FOLLOWING IS THE NEW FILTER IMPLEMENTATION, WHICH IS BASED ON THIS PSEUDO-CODE
//
// First stage (sample frame number)
//    frameSamplePeriod should be <= nominalFramePeriod
//    frameUpdatePeriod = vitcTypeUpdate && kWorstCaseHardwareUpdateTime < nominalFramPeriod ?
//       nominalFramePeriod : kWorstCaseHardwareUpdateTime
//    minForwardFilterDepth = log2((frameUpdatePeriod + minForwardFilterLength) / frameSamplePeriod) + 2
//    minReverseFilterDepth = log2((frameUpdatePeriod + minReverseFilterLength) / frameSamplePeriod) + 2
//    every frameSamplePeriod (can use waitTime as a delay)
//       read beforeSampleNumber
//       read inputFrameNumber
//       read afterSampleNumber
//       inputSampleNumber = captureTimeVaries ? (beforeSampleNumber + afterSampleNumber) >> 1 : beforeS
//          ampleNumber
// Second stage (lowpass filter)
//    static samplePeriods = 0
//    static currentPosition = 0
//    static filterDepthLimit = 1 << kMaxFilterDepth
//    static pass = 0
//    static filterArray[(1 << kMaxFilterDepth) + 1]   // Initialize frames starting at 0, spaced apart b
//       y initialFrameNumber
//                                                      // Initialize samples starting at 0, spaced apart
//       by frameSamplePeriod
//    filterRate[kMaxFilterDepth+1]
//    newSamplePeriods = (currentTime + (frameSamplePeriod >> 1) - lastIterateTime) / frameSamplePeriod
//    if (kExternalFrameClock)
//       if (newSamplePeriods > 0)
//          lastIterateTime = currentTime
//    else
//       lastIterateTime += newSamplePeriods * frameSamplePeriod
//    waitTime = lastIterateTime + frameSamplePeriod - currentTime
//    samplePeriods += newSamplePeriods
//    if (samplePeriods == 0 || newSamplePeriods > 1)
//       return waitTime
//    lastPoint = mFilterArray[currentPosition - 1] - mFilterArray[mCurrentPosition - 2]
//    for (j = 1; j <= samplePeriods; j++)   // optimize loop for the case j == samplePeriods
//       filterArray[currentPosition].frame = filterArray[currentPosition - 1].frame +
//          lastPoint.frame + (j * (inputFrameNumber - lastPoint.frame)) / samplePeriods
//       filterArray[currentPosition].sample = filterArray[currentPosition - 1].sample +
//          lastPoint.sample + (j * (inputSampleNumber - lastPoint.sample)) / samplePeriods
//       // determine the minimum filter depth based on whether we're going forward or backward
//       minFilterDepth = max(minForwardFilterDepth, minReverseFilterDepth)
//       minFilterDepth = filterArray[currentPosition].frame +
//          filterArray[currentPosition - (1 << minFilterDepth)].frame -
//          (filterArray[currentPosition - (1 << minFilterDepth - 1)].frame << 1) >= 0 ?
//             minForwardFilterDepth : minReverseFilterDepth
//       // calculate rate in frames/period (really use fixed point)
//       rate = filterArray[currentPosition] + filterArray[currentPosition - (1 << minFilterDepth)] -
//          (filterArray[currentPosition - (1 << minFilterDepth - 1)] << 1) >> 2
//       for (currentFilterDepth = kMaxFilterDepth, i = minFilterDepth; i <= kMaxFilterDepth; i++)
//          filterRate[i] = filterArray[currentPosition] + filterArray[currentPosition - (1 << i)] -
//             (filterArray[currentPosition - (1 << i - 1)] << 1)
//          // the following rate compare adds the variance in frameSamplePeriod to the variance in the
//          input frame rate
//             // if the variance in frameSamplePeriod is significant, rate should be calculated by dividin
//          g the difference
//             // in frame numbers by the difference in sample numbers
//             if (currentFilterDepth == kMaxFilterDepth && abs(rate.frame << 2 - filterRate[i].frame) > (5
//                << i) >> 2)  // never true for i==minFilterDepth
//                currentFilterDepth = i - 1
```

```
//         rate = filterRate[i]
//         if (1 << currentFilterDepth < mFilterDepthLimit)
//             filterDepthLimit = 1 << currentFilterDepth
//         while (1 << currentFilterDepth > filterDepthLimit) // limit increase in depth to prevent usage
//  of "stable" filter that actually
//             currentFilterDepth--                           // has equal but opposite transients passing
//  through it
//         if (filterDepthLimit < 1 << kMaxFilterDepth)
//             filterDepthLimit++
//         if (++pass == kDecimate)
//             filterPipe.PutItem(filterArray[currentPosition] - filterArray[currentPosition - (1 << curren
tFilterDepth)] +
//             (filterRate[currentFilterDepth] << 1) >> currentFilterDepth,
//             filterRate[currentFilterDepth] * kDecimate >> (currentFilterDepth - 1 << 1))
//             pass = 0
//         currentPosition++        // modulo size of filterArray[] (use double-size filterArray, enter val
ues twice)
//     samplePeriods = 0
//     return waitTime
// Third stage (frame tracker)
//     wait while filterPipe is empty
//     filterOutput = filterPipe.GetItem()
//     newFrameNumber = filterOutput.frame
//     newSampleNumber = filterOutput.sample
//     newRateFrameDelta = filterOutput.rate.frame
//     newRateSampleDelta = filterOutput.rate.sample
//     get commandTimeStamp at which a rate command sent this iteration will take effect
//     rateTimeStamp = commandTimeStamp
//     if (rateTimeStamp < cueTimeStamp)
//         rateTimeStamp = cueTimeStamp
//     nextRateTimeStamp = commandTimeStamp + newRateSampleDelta
//     currentRate = newRateFrameDelta * samplesPerFrame / newRateSampleDelta
//     position = actualPosition + lastActualRate * (rateTimeStamp - lastActualRateTimeStamp)
//     desiredNextPosition = newFrameNumber * samplesPerFrame + currentRate * (nextRateTimeStamp - newSam
pleNumber)
//     newRate = (desiredNextPosition - position) / (nextRateTimeStamp - rateTimeStamp)
// Fourth stage (transport control)
//     desiredPosition = newFrameNumber * samplesPerFrame + currentRate * (rateTimeStamp - newSampleNumbe
r)
//     error = abs(desiredPosition - position)
//     // FF and REW should not be implemented at this level--instead, kMaxRate should be set to somethin
g higher than
//     // the FF/REW rate and the transport should do something like periodically stop/cue/play to simula
te CD-type shuttling
//     if (newRate > kMaxRate)
//         newRate = kMaxRate
//     if (newRate < -kMaxRate)
//         newRate = -kMaxRate
//     rateTolerance = ((kMaxUnityError / samplesPerFrame) * nominalFramePeriod) / (frameSamplePeriod * k
Decimate)
//     kSyncWindowFactor = 8    // Use tighter rate & position windows before locking into unity speed
//     if (newRate > 1.0 - rateTolerance && newRate < 1.0 + rateTolerance && error < kMaxUnityError)
//         if (unityRateTimer < forwardSyncLockDelay)
//             if (newRate > 1.0 - rateTolerance / kSyncWindowFactor &&
//                 newRate < 1.0 + rateTolerance / kSyncWindowFactor && error < kMaxUnityError / kSyncWindowFa
ctor)
//                 unityRateTimer++
//         else
//             newRate = 1.0
//     else if (newRate < -1.0 + rateTolerance && newRate > -1.0 - rateTolerance && error < kMaxUnityErro
r)
//         if (unityRateTimer > reverseSyncLockDelay)
//             if (newRate < -1.0 + rateTolerance / kSyncWindowFactor &&
//                 newRate > -1.0 - rateTolerance / kSyncWindowFactor && error < kMaxUnityError / kSyncWindowF
actor)
//                 unityRateTimer--
//         else
//             newRate = -1.0
//     else
//         unityRateTimer = 0
//     currentRateCueHint = (currentRate <= 0 ? kBackward : 0) | (currentRate >= 0 ? kForward : 0)
//     if (error > kMaxChaseError && abs(newRate) == kMaxRate || cueHint != kBidirectional && currentRate
CueHint & ~cueHint)
//         cueHint = currentRateCueHint
//         cueSettleTime = kCueSettleTime << (cueHint == kBidirectional)
//         if (cueSettleTime < newRateSampleDelta)
//             cueSettleTime = newRateSampleDelta
//         cueTimeStamp = commandTimeStamp + cueSettleTime
//         newRate = 0
//         if (newRate != lastActualRate)
//             set transport rate to newRate at commandTimeStamp with zero lock
//         position = newFrameNumber * samplesPerFrame + currentRate * (cueTimeStamp - newSampleNumber)
//         cue transport to position at commandTimeStamp with cueHint
//         cuePosition = position
//     else if (commandTimeStamp + newRateFilterDelta >= cueTimeStamp)
```

```
//      lock = (unityRateTimer == forwardSyncLockDelay || unityRateTimer == reverseSyncLockDelay) && ab
         s(newRate) == 1.0
//      if (newRate != lastActualRate || lock != lastActualLock)
//          set transport rate to newRate at rateTimeStamp with lock
//      cueTimeStamp = rateTimeStamp
//      if (cueHint != kBidirectional)
//          if (position >= cuePosition + kCueSettleTime)
//              cueHint |= kBackward
//          else if (position <= cuePosition - kCueSettleTime)
//              cueHint |= kForward
// Upon receipt of a transport rate command
//      actualPosition += lastActualRate * (cmd.mTimeStamp - lastActualRateTimeStamp)
//      lastActualRate = cmd.mRate
//      lastActualRateTimeStamp = cmd.mTimeStamp
//      lastActualLock = cmd.mLock
// Upon receipt of a transport cue command
//      actualPosition = cmd.mCue.mTime
//      lastActualRateTimeStamp = cmd.mTimeStamp
// static const Int16 INFINITE_SYNCLOCK_DELAY  = 0x7FFF;

SyNewRateControl::SyNewRateControl
(
    IEEE32 sampleRate,                      // Samples/second
    IEEE32 nominalFramePeriod,              // Milliseconds/frame for this type of time code at unity r
     ate
    Bool32 vitcTypeUpdate,                  // TRUE iff frame numbers change only on nominal frame peri
     od boundaries
    UInt32 forwardSyncLockDelay,            // Time in ms over which timecode rate must stay at play sp
     eed before a play command is issued
    UInt32 reverseSyncLockDelay,            // Time in ms over which timecode rate must stay at play re
     verse speed before a play reverse command is issued
    UInt32 minForwardFilterLength,          // Period in ms over which average timecode rate is stable
     in the forward direction
    UInt32 minReverseFilterLength,          // Period in ms over which average timecode rate is stable
     in the reverse direction
    UInt32 frameSamplePeriod ,              // Period between calls to CalculateRate(), should be <= no
     minalFramePeriod
    Bool32 externalFrameSampleClock,        // TRUE iff period between calls to CalculateRate is driven
     by external clock
    IEEE32 maxFrameSamplePeriodvariance,    // Ideally less than half of frameSamplePeriod (see note in
     FilterFrameNumber())
    IEEE32 captureDelay,                    // ms between H/W capture of frame number and middle of Cur
     rentFrameNumber() call
    Bool32 captureTimevaries,               // TRUE iff call to CurrentFrameNumber() take a variable am
     ount of time
    Bool32 throwAwayLateFilterPoints,       // TRUE if late calls to CalculateRate can happen, FALSE if
     calls to CalculateRate
                                            // might be skipped but will not affect subsequent calls
    Bool32 correctForFilterDelay,           // TRUE if the output should be adjusted to correct for the
     positional
                                            // (time) delay through the filter; generally TRUE for time
     code filters
                                            // (so they lock at the right position) and FALSE for jog f
     ilters
    UInt16 decimationFactor,                // Transport rate will be updated every decimationFactor*fr
     ameSamplePeriod ms
    Int32 priority,                         // Should be no higher than the thread that calls Calculate
     Rate(), or
                                            // accuracy of CalculateRate()'s return value may be advers
     ely affected
    IEEE32 worstCaseHardwareUpdateTime,     // Max time for hardware to update frame number when input
     time code changes
    IEEE32 maxRate,                         // Max +/- rate at which we can move the transport (default
     +12.5% varispeed)
    IEEE32 maxUnityError,                   // Maximum number of frames we can be off by and still main
     tain "unity" rate
    IEEE32 maxChaseError,                   // Maximum number of frames we can be off while chasing bef
     ore cueing to catch up
    UInt16 maxFilterDepth,                  // Length of the longest FIR filter will be 1 << maxFilterD
     epth
    UInt32 pipeDepth                        // Depth of sync pipe used to pass decimated filter points
     to output stage
) :
    SyTask(NULL, NULL, 0, TRUE, INFINITE, TRUE, priority),
    kSamplesPerMillisecond(sampleRate / 1000.0),
    mFrameUpdatePeriod
    (
    (
        vitcTypeUpdate && worstCaseHardwareUpdateTime < nominalFramePeriod
        ?
        nominalFramePeriod
        :
        worstCaseHardwareUpdateTime
```

```
    )
    +
    maxFrameSamplePeriodVariance
),
kFrameSamplePeriod(frameSamplePeriod),
kExternalFrameSampleClock(externalFrameSampleClock),
kCaptureDelay(captureDelay * sampleRate / 1000.f),
kCaptureTimeVaries(captureTimeVaries),
kThrowAwayLateFilterPoints(throwAwayLateFilterPoints),
mCorrectForFilterDelay(correctForFilterDelay),
kMaxFilterDepth(maxFilterDepth),
kDecimate(decimationFactor),
mFilterArray(new SyFilterPoint[1 << maxFilterDepth + 1]),   // Double the size of the array to simpli
    fy indexing
mFilterRate(new SyFilterPoint[maxFilterDepth + 1]),
mFilterPipe(pipeDepth),
kMaxRate(maxRate),
kRateTolerance((maxUnityError * nominalFramePeriod) / (frameSamplePeriod * decimationFactor)),
kMaxUnityError(maxUnityError * nominalFramePeriod * sampleRate / 1000.0),
kMaxChaseError(maxChaseError * nominalFramePeriod * sampleRate / 1000.0),
kRatePrecisionThreshold(5 * nominalFramePeriod * sampleRate / 1000.0),
IterateFrameFilter(&SyNewRateControl::InitIterateFrameFilter),
mTimeCodeAnchor(kInvalidAESTime)
{
    // Set the minimum filter depths and sync lock delays
    this->UpdateForwardFilterLength(minForwardFilterLength);
    this->UpdateReverseFilterLength(minReverseFilterLength);
    this->UpdateForwardSyncLockDelay(forwardSyncLockDelay);
    this->UpdateReverseSyncLockDelay(reverseSyncLockDelay);

// Initialize the critical section
    ::SyInitializeCriticalSection(&mTransportCS);

// Set system timer resolution for SyTimeGetTime()
    UInt32 maxResolution;
    ::SyTimeGetDevCaps(&mTimerResolution, &maxResolution);
    ::SyTimeBeginPeriod(mTimerResolution);

// Add pipe empty semaphore to the base SyTask wait list and start the task
    this->AddObject(((SySemaphoreSemaphore*)mFilterPipe.EmptySemaphore())->GetHandle());
    this->Start();
}

//#define _DEBUG_BCD
#ifdef _DEBUG_BCD
extern UInt32 gBCDSize;
extern UInt32 gBCDCount;
extern UInt8 gBCD[][4];
extern TimeCode gTimeCode[];

Int32 gTimeStamp[1000];
#endif

SyNewRateControl::~SyNewRateControl(void)
{
    // Shut down the transport control task
    this->Kill();

#ifdef _DEBUG_BCD
    for (UInt32 i = gBCDCount; i < gBCDSize; i++)
    {
        SYRELTRACE(_T("%c%c:%c%c:%c%c:%c%c           %I64d"),
            (gBCD[i][3] >> 4 & 0xF) + _T('0'),
            (gBCD[i][3] & 0xF) + _T('0'),
            (gBCD[i][2] >> 4 & 0xF) + _T('0'),
            (gBCD[i][2] & 0xF) + _T('0'),
            (gBCD[i][1] >> 4 & 0xF) + _T('0'),
            (gBCD[i][1] & 0xF) + _T('0'),
            (gBCD[i][0] >> 4 & 0xF) + _T('0'),
            (gBCD[i][0] & 0xF) + _T('0'),
            gTimeCode[i]);
        SYRELTRACE(_T("           %ld\n"), gTimeStamp[i]);
    }
    for (i = 0; i < gBCDCount; i++)
    {
        SYRELTRACE(_T("%c%c:%c%c:%c%c:%c%c           %I64d"),
            (gBCD[i][3] >> 4 & 0xF) + _T('0'),
            (gBCD[i][3] & 0xF) + _T('0'),
            (gBCD[i][2] >> 4 & 0xF) + _T('0'),
            (gBCD[i][2] & 0xF) + _T('0'),
            (gBCD[i][1] >> 4 & 0xF) + _T('0'),
            (gBCD[i][1] & 0xF) + _T('0'),
            (gBCD[i][0] >> 4 & 0xF) + _T('0'),
            (gBCD[i][0] & 0xF) + _T('0'),
            gTimeCode[i]);
```

```
        SYRELTRACE(_T("        %ld\n"), gTimeStamp[i]);
    }
endif
    // Undo timer resolution setting
    ::SyTimeEndPeriod(mTimerResolution);

// Delete the critical section
    ::SyDeleteCriticalSection(&mTransportCS);

// Free up the filter arrays
    delete[] mFilterRate;
    delete[] mFilterArray;
} uInt32 SyNewRateControl::CalculateRate(void)
{
    //
    // Call functions which perform the first stage (sample the time code) and second stage
    // (filter the time code) of rate processing, as well as send decimated data to the third stage
    //
    return (this->*IterateFrameFilter)(this->GetFrameNumber());
} uInt32 SyNewRateControl::Iterate(Int16)
{
    // Local variables for the third and fourth stages of the filter
    SyFilterPipeItem filterPoint;
    IEEE32 currentRate;
    IEEE32 newRate;
    TimeCode position;
    TimeStamp rateTimeStamp;
    TimeStamp commandTimeStamp;

// Release the empty semaphore because we waited on it in order to Iterate(), thereby artificially de
        crementing it
    mFilterPipe.EmptySemaphore()->Increment();

//
    // Get the decimated data from the second stage and call functions to peform the third stage
    // (track the time code) and fourth stage (control transport rate and cueing) of rate processing
    //
    mFilterPipe.GetItem(filterPoint);
    this->TrackFrames(filterPoint, currentRate, newRate, position, rateTimeStamp, commandTimeStamp);
    this->ControlTransport(filterPoint, currentRate, newRate, position, rateTimeStamp, commandTimeStamp);
    return 0;
}

SyFilterPoint SyNewRateControl::GetFrameNumber(void)
{
    //
    // Construct a filter point by reading the reference time, reading the time code, reading the
    // reference time again and averaging the two reference times
    //
    SyFilterPoint filterPoint;
    filterPoint.mSample = this->ExtendTimeStamp(this->GetReferenceTime());
#ifdef _TRACE_CAPTURE_TIME
    SYRELTRACE(_T("GFN: timeOffsetBefore = %ld\n"), ::SyTimeGetTime() - (mLastIterateTime + kFrameSample
        Period));
#endif
    filterPoint.mFrame = this->CurrentFrameNumber();
    if (filterPoint.mSample != kInvalidAESTime)
    {
#ifdef _TRACE_CAPTURE_TIME
    SYRELTRACE(_T("GFN: timeOffsetAfter = %ld\n"), ::SyTimeGetTime() - (mLastIterateTime + kFrameSampleP
        eriod));
#endif
        if (kCaptureTimeVaries)
        {
            TimeStamp timeStamp = this->GetReferenceTime();
            if (timeStamp != kInvalidAESTime)
            {
                filterPoint.mSample += this->ExtendTimeStamp(timeStamp);
                filterPoint.mSample >>= 1;
            }
        }
        filterPoint.mSample -= this->GetTimeStampDelay() - kCaptureDelay;
    }
#ifdef _DEBUG_BCD
    static TimeStamp last = kInvalidAESTime;
    if (last != kInvalidAESTime)
    {
        gTimeStamp[gBCDCount++] = filterPoint.mSample - last;
        if (gBCDCount == gBCDSize)
        {
            /*
```

```
            for (UInt32 i = 0; i < gBCDSize; i++)
            {
                SYRELTRACE(_T("%c%c:%c%c:%c%c:%c%c          %I64d"),
                    (gBCD[i][3] >> 4 & 0xF) + _T('0'),
                    (gBCD[i][3] & 0xF) + _T('0'),
                    (gBCD[i][2] >> 4 & 0xF) + _T('0'),
                    (gBCD[i][2] & 0xF) + _T('0'),
                    (gBCD[i][1] >> 4 & 0xF) + _T('0'),
                    (gBCD[i][1] & 0xF) + _T('0'),
                    (gBCD[i][0] >> 4 & 0xF) + _T('0'),
                    (gBCD[i][0] & 0xF) + _T('0'),
                    gTimeCode[i]);
                SYRELTRACE(_T("          %ld\n"), gTimeStamp[i]);
            }
        */
            gBCDCount = 0;
            //::DebugBreak();
        }
    }
    last = filterPoint.mSample;
#endif
    return filterPoint;
}

UInt32 SyNewRateControl::InitIterateFrameFilter(const SyFilterPoint& filterPoint)
{
    // Check for valid reference time
    if (filterPoint.mSample == kInvalidAESTime)
        return kFrameSamplePeriod;

// Initialize filter variables
    mLastIterateTime = ::SyTimeGetTime() - kFrameSamplePeriod;
    mSamplePeriods = 0;
    mFilterDepthLimit = 1 << kMaxFilterDepth;
    mPass = 0;
    mCurrentPosition = 0;
    mFilterArray[mCurrentPosition].mFrame = 0;
    mFilterArray[mCurrentPosition].mSample = 0;
    mFilterArray[mCurrentPosition + (1 << kMaxFilterDepth)] = mFilterArray[mCurrentPosition];
    for (mCurrentPosition++; mCurrentPosition < 1 << kMaxFilterDepth; mCurrentPosition++)
    {
        mFilterArray[mCurrentPosition].mFrame = mFilterArray[mCurrentPosition - 1].mFrame + filterPoint.mF
            rame;
        mFilterArray[mCurrentPosition].mSample = mFilterArray[mCurrentPosition - 1].mSample +
            filterPoint.mSample - kFrameSamplePeriod * kSamplesPerMillisecond * ((1 << kMaxFilterDepth) - mCu
            rrentPosition);
        mFilterArray[mCurrentPosition + (1 << kMaxFilterDepth)] = mFilterArray[mCurrentPosition];
    }

// Initialize output stage variables here, also, so the timestamps will at least have reasonable valu
        es
    mCueTimeStamp = mLastActualRateTimeStamp = this->GetReferenceTime();
    mLastActualRate = 0.0;
    mLastActualLock = FALSE;
    mActualPosition = mCuePosition = this->TransportTime();
    //SYTRACE(_T("MAP set to %f\n"), (float) mActualPosition);
    mUnityRateTimer = 0;
    mCueHint = CUEHINT_BIDIRECTIONAL;

// Pass control for this and all future iterations to DoIterateFrameFilter()
    this->IterateFrameFilter = &SyNewRateControl::DoIterateFrameFilter;
    return this->DoIterateFrameFilter(filterPoint);
}

UInt32 SyNewRateControl::DoIterateFrameFilter(const SyFilterPoint& filterPoint)
{
    // Check for valid reference time
    if (filterPoint.mSample == kInvalidAESTime)
    {
        this->IterateFrameFilter = &SyNewRateControl::InitIterateFrameFilter;
        return kFrameSamplePeriod;
    }

// See how much time there is before the next iteration, and see if we've missed any iterations
    UInt32 time = ::SyTimeGetTime();
    UInt32 newSamplePeriods = (time + (kFrameSamplePeriod >> 1) - mLastIterateTime) / kFrameSamplePeriod;
    if (kExternalFrameSampleClock)
    {
        if (newSamplePeriods > 0)
            mLastIterateTime = time;
    }
    else
        mLastIterateTime += newSamplePeriods * kFrameSamplePeriod;
    Int32 waitTime = mLastIterateTime + kFrameSamplePeriod - time;
#ifdef _TRACE_ITERATE_TIME
```

```
        SYRELTRACE(_T("DIFF:  timeErr = %ld\n"), time - (mLastIterateTime + kFrameSamplePeriod));
#endif
    mSamplePeriods += newSamplePeriods;

// If the last iteration was too short or too long, don't use the current filter point
#ifdef _DEBUG
    static UInt32 total;
    static UInt16 number;
    static UInt16 period;
    if (newSamplePeriods > 1)
    {
        total += newSamplePeriods;
        number++;
        if (period == 0)
        {
            if (number == 1)
                SYRELTRACE(_T("SyNewRateControl::IterateFrameFilter:  newSamplePeriods = %ld\n"), newSameP
            eriods);
            else
                SYRELTRACE(_T("SyNewRateControl::IterateFrameFilter:  total of %d newSamplePeriods = %ld\n")
            , number, total);
            total = 0;
            number = 0;
            period++;
        }
    }
    if (period != 0 && period++ == 100)
    {
        period = 0;
        if (number != 0)
        {
            if (number == 1)
                SYRELTRACE(_T("SyNewRateControl::IterateFrameFilter:  newSamplePeriods = %ld\n"), total);
            else
                SYRELTRACE(_T("SyNewRateControl::IterateFrameFilter:  total of %d newSamplePeriods = %ld\n")
            , number, total);
            total = 0;
            number = 0;
        }
    }
endif
    if (mSamplePeriods == 0 || (kThrowAwayLateFilterPoints && newSamplePeriods > 1))
        return waitTime;

// Put the new filter point into the frame filter (and construct fake filter points if we missed iter
        ations)
    SyFilterPoint lastPoint = mFilterArray[mCurrentPosition - 1] - mFilterArray[mCurrentPosition - 2];
    for (Int32 i = 1; i < mSamplePeriods; i++)
    {
        //
        // This loop should only execute if a previous iteration of getting the frame sample period
        // took too long.
        //
        SyFilterPoint fp;
        fp.mFrame = lastPoint.mFrame + (i * (filterPoint.mFrame - lastPoint.mFrame)) / mSamplePeriods;
        fp.mSample = lastPoint.mSample + (i * (filterPoint.mSample - lastPoint.mSample)) / mSamplePeriods;
        this->FilterFrameNumber(fp);
    }
    this->FilterFrameNumber(filterPoint);
    mSamplePeriods = 0;
    return waitTime;
} if defined(_DEBUG) || defined(NDEBUG)
SyFilterPipeItem::SyFilterPipeItem(const SyFilterPoint& filterPoint, const SyFilterPoint& rate, UInt16 d
        epth, UInt16 position) :
    SyFilterPoint(filterPoint),
    mRate(rate),
    mDepth(depth),
    mPosition(position)
{
}
else
SyFilterPipeItem::SyFilterPipeItem(const SyFilterPoint& filterPoint, const SyFilterPoint& rate) :
    SyFilterPoint(filterPoint),
    mRate(rate)
{
}
endif void SyNewRateControl::FilterFrameNumber(const SyFilterPoint& filterPoint)
{
    //
    // The values stored in mFilterArray[] are the cumulative sums of frame and sample numbers.  They are
        kept
```

```
// this way so that the sum of the frame/sample numbers between any two positions in the array can be
// determined by taking the difference between those two points, which in turn allows the average fra
    me or
// sample number over that interval to be determined. This means that the values in mFilterArray[] w
    ill
// periodically overflow the word size used to store the numbers, but this doesn't matter since we on
    ly
// care about the difference between the values (provided the word size is large enough to represent
    the
// cumulative frame/sample delta over (1 << kMaxFilterDepth) samples).
//
// The values stored in mFilterRate[] are shifted left by (filterDepth - 1 << 1); where filterDepth i
    s the
// index into the array (e.g., mFilterRate[3].mFrame and mFilterRate[3].mSample are both sixteen time
    s the
// actual frame number rate and sample number rate that is actually represented).
//

// Put the new filter point into the filter array
mFilterArray[mCurrentPosition] = mFilterArray[mCurrentPosition - 1] + filterPoint;

// Copy the member variable to a local variable in order to keep them thread-safe
UInt16 minForwardFilterDepth = mMinForwardFilterDepth;
UInt16 minReverseFilterDepth = mMinReverseFilterDepth;

// Determine the minimum filter depth based on whether we're going forward or backward
UInt16 minFilterDepth = SyMax(minForwardFilterDepth, minReverseFilterDepth);
minFilterDepth =
    (
        mFilterArray[mCurrentPosition].mFrame
        +
        mFilterArray[mCurrentPosition - (1 << minFilterDepth)].mFrame
        -
        (mFilterArray[mCurrentPosition - (1 << minFilterDepth - 1)].mFrame << 1)
    )
    >=
    0
    ?
    minForwardFilterDepth
    :
    minReverseFilterDepth;

// Process filter levels from minFilterDepth to kMaxFilterDepth,
// and set currentFilterDepth depending on how fast the rate is changing
SyFilterPoint rate =
    mFilterArray[mCurrentPosition]
    +
    mFilterArray[mCurrentPosition - (1 << minFilterDepth)]
    -
    (mFilterArray[mCurrentPosition - (1 << minFilterDepth - 1)] << 1)
    >>
    2;
UInt16 currentFilterDepth = kMaxFilterDepth;
//#define _TRACE_RATE_COMPARE
//#define _TRACE_BAD_RATE
#if defined(_TRACE_RATE_COMPARE) || defined(_TRACE_BAD_RATE)
    Bool8 rateCompare[8] = {2, 2, 2, 2, 2, 2, 2, 2};
#endif
#ifdef _TRACE_BAD_RATE
    static UInt32 rateStability[8] = {0, 0, 0, 0, 0, 0, 0, 0};
#endif
    for (UInt16 i = minFilterDepth; i <= kMaxFilterDepth; i++)
    {
        mFilterRate[i] =
            mFilterArray[mCurrentPosition]
            +
            mFilterArray[mCurrentPosition - (1 << i)]
            -
            (mFilterArray[mCurrentPosition - (1 << i - 1)] << 1);
//
// The following rate compare adds the variance in frameSamplePeriod to the variance in the input
    frame rate.
// If the variance in frameSamplePeriod is significant, rate should be calculated by dividing the
    difference
// in frame numbers by the difference in sample numbers.
//
// Note that the compare never succeeds for i==minFilterDepth (i.e., the first loop iteration).
//
// !!! - We could probably make a tighter check by saving rate limits at each depth, so that every
    shorter filter
//       could invalidate any longer filter, not just the next longer filter
//
#if defined(_TRACE_RATE_COMPARE) || defined(_TRACE_BAD_RATE)
        rateCompare[i - 1] = SY::abs((rate.mFrame << 2) - mFilterRate[i].mFrame) <= (kRatePrecisionThresho
            ld << i) >> 2;
```

```
#endif
#ifdef _TRACE_BAD_RATE
        if (i > minFilterDepth + 1)
        {
            if (!rateCompare[i - 1])
                rateStability[i - 1] = 0;
            else if (!rateCompare[i - 2] || rateStability[i - 1] != 0)
            {
                if (++rateStability[i - 1] >= 1 << i - 1)
                {
                    SYRELTRACE(_T("****** virtual rate error:  minFilterDepth (now %d) should be at least %d
******\n"), minFilterDepth, i - 1);
                    rateStability[i - 1] = 0;
                }
            }
        }
endif
        if
        (
            currentFilterDepth == kMaxFilterDepth
            &&
            SY::abs((rate.mFrame << 2) - mFilterRate[i].mFrame) > (kRatePrecisionThreshold << i) >> 2
        )
            currentFilterDepth = i - 1;
        rate = mFilterRate[i];
    }
    //
    // Limit any increase in depth to prevent usage of a "stable" filter that actually
    // has equal but opposite transients passing through it
    //
    if (1 << currentFilterDepth < mFilterDepthLimit)
#ifdef _TRACE_DEPTH_TRUNCATION
    {
        if (1 << currentFilterDepth <= mFilterDepthLimit >> 1)
            SYTRACE
            (
                _T("Depth truncated:  curDepth=%d  limit=%d  rate[curDepth]<<16=0x%I64X - rate[curDepth+1]<<
16=0x%I64X > 0x%I64X\n"),
                currentFilterDepth,
                mFilterDepthLimit,
                mFilterRate[currentFilterDepth].mFrame << 18 - (currentFilterDepth << 1),
                mFilterRate[currentFilterDepth+1].mFrame << 16 - (currentFilterDepth << 1),
                kRatePrecisionThreshold << 15 - currentFilterDepth
            );
#endif
        mFilterDepthLimit = 1 << currentFilterDepth;
#ifdef _TRACE_DEPTH_TRUNCATION
    }
endif
    while (1 << currentFilterDepth > mFilterDepthLimit)
        currentFilterDepth--;
    if (mFilterDepthLimit < 1 << kMaxFilterDepth)
        mFilterDepthLimit++;

//#define _TRACE_INPUT_DELTA
#ifdef _TRACE_RATE_COMPARE
    SYRELTRACE(_T("RC:  %d%d%d%d%d%d%d%d"),
        rateCompare[0], rateCompare[1], rateCompare[2], rateCompare[3],
        rateCompare[4], rateCompare[5], rateCompare[6], rateCompare[7]);
#ifndef _TRACE_INPUT_DELTA
    SYRELTRACE(_T("\n"));
#else
    SYRELTRACE(_T("  "));
#endif
#endif
#ifdef _TRACE_INPUT_DELTA
    rate = mFilterArray[mCurrentPosition] + mFilterArray[mCurrentPosition - 2] - (mFilterArray[mCurrentPo
sition - 1] << 1);
    SYRELTRACE(_T("FFN:  F=%I64d  S=%I64d\n"), rate.mFrame, rate.mSample);
#endif
#ifdef _TRACE_BAD_RATE
    static Bool8 lastDeepCompare;
    if (lastDeepCompare && !rateCompare[kMaxFilterDepth - 1])
    {
        SYRELTRACE(_T("****** real rate change:  minForwardFilterDepth = %d, minReverseFilterDepth = %d **
****\n"),
            mMinForwardFilterDepth, mMinReverseFilterDepth);
    }
    lastDeepCompare = rateCompare[kMaxFilterDepth - 1];
endif // Every kDecimate passes, send a filter point to the frame tracker
    if (++mPass == kDecimate)
    {
        mFilterPipe.PutItem
```

```
(
    SyFilterPipeItem
    (
        mCorrectForFilterDelay
        ?
        mFilterArray[mCurrentPosition]
        -
        mFilterArray[mCurrentPosition - (1 << currentFilterDepth)]
        +
        (mFilterRate[currentFilterDepth] << 1)
        >>
        currentFilterDepth
        :
        mFilterArray[mCurrentPosition]
        -
        mFilterArray[mCurrentPosition - (1 << currentFilterDepth)]
        >>
        currentFilterDepth,
        mFilterRate[currentFilterDepth] * kDecimate >> (currentFilterDepth - 1 << 1)
#if defined(_DEBUG) || defined(NDEBUG)
        ,
        currentFilterDepth,
        mCurrentPosition
#endif
    )
);
#ifdef _TRACE_PIPE_INPUT
    SyFilterPipeItem pi
    (
        mCorrectForFilterDelay
        ?
        mFilterArray[mCurrentPosition]
        -
        mFilterArray[mCurrentPosition - (1 << currentFilterDepth)]
        +
        (mFilterRate[currentFilterDepth] << 1)
        >>
        currentFilterDepth
        :
        mFilterArray[mCurrentPosition]
        -
        mFilterArray[mCurrentPosition - (1 << currentFilterDepth)]
        >>
        currentFilterDepth,
        mFilterRate[currentFilterDepth] * kDecimate >> (currentFilterDepth - 1 << 1)
    );
    SYTRACE(_T("PI:  F=%I64d  S=%I64d  RF=%I64d  RS=%I64d  depth=%d  curPos=%d\n"),
        pi.mFrame, pi.mSample, pi.mRate.mFrame, pi.mRate.mSample, currentFilterDepth, mCurrentPosition);
#endif
    mPass = 0;
}

// Store the filter point again, since the array size has been doubled to simplify indexing
mFilterArray[mCurrentPosition - (1 << kMaxFilterDepth)] = mFilterArray[mCurrentPosition - 1] + filter
    Point;

// Move to the next position in the filter array
mCurrentPosition++;
mCurrentPosition &= (1 << kMaxFilterDepth) - 1;
mCurrentPosition |= 1 << kMaxFilterDepth;
} void SyNewRateControl::TrackFrames
(
    SyFilterPipeItem& newFilterPoint,    // newFilterPoint is an input to the function, all following args
        are outputs
    IEEE32& currentRate,
    IEEE32& newRate,
    TimeCode& position,
    TimeStamp& rateTimeStamp,
    TimeStamp& commandTimeStamp
)
{
    // This is the frame tracker, which calculates the rates and timestamps needed by the transport contr
        oller
    commandTimeStamp = this->GetReferenceTime();
    rateTimeStamp = commandTimeStamp;
    if (rateTimeStamp < mCueTimeStamp)
        rateTimeStamp = mCueTimeStamp;
    _ASSERT((Int32)newFilterPoint.mRate.mSample > 0);
    TimeStamp nextRateTimeStamp = commandTimeStamp + (TimeStamp)newFilterPoint.mRate.mSample;
    currentRate = (IEEE32)(newFilterPoint.mRate.mFrame) / newFilterPoint.mRate.mSample;
    //SYTRACE(_T("cr: %f, mFrame: %I64d, mSample: %I64d\n"), (float) currentRate,
    //    newFilterPoint.mRate.mFrame, newFilterPoint.mRate.mSample);
    ::SyEnterCriticalSection(&mTransportCS);
```

```
        position = mActualPosition + mLastActualRate * (rateTimeStamp - mLastActualRateTimeStamp);
    ::SyLeaveCriticalSection(&mTransportCS);
    TimeCode desiredNextPosition = newFilterPoint.mFrame + (TimeCode)(currentRate * (nextRateTimeStamp -
        (TimeStamp)newFilterPoint.mSample));
    newRate = (IEEE32)(desiredNextPosition - position) / (nextRateTimeStamp - rateTimeStamp);
} void SyNewRateControl::ControlTransport
(
    SyFilterPipeItem newFilterPoint,
    IEEE32 currentRate,
    IEEE32 newRate,
    TimeCode position,
    TimeStamp rateTimeStamp,
    TimeStamp commandTimeStamp
)
{
    // Find out where we should be and how far that is from where we are
    TimeCode desiredPosition = newFilterPoint.mFrame + (TimeCode)(currentRate * (rateTimeStamp - (TimeSta
        mp)newFilterPoint.mSample));
    TimeDelta error = SY::abs(desiredPosition - position);

// Limit rate to what the transport can handle
    if (newRate > kMaxRate)
        newRate = kMaxRate;
    if (newRate < -kMaxRate)
        newRate = -kMaxRate;

// Copy member variables to local variables for thread protection
    Int16 forwardSyncLockDelay = mForwardSyncLockDelay;
    Int16 reverseSyncLockDelay = mReverseSyncLockDelay;

// If the rate is close enough to +/- 1.0, assume it is exactly +/- 1.0
    if
    (
        newRate > 1.0 - kRateTolerance &&
        newRate < 1.0 + kRateTolerance &&
        error < kMaxUnityError
    )
    {
        if (forwardSyncLockDelay == INFINITE_SYNCLOCK_DELAY)
            mUnityRateTimer = 0;
        else if (mUnityRateTimer < forwardSyncLockDelay)
        {
            // Use a tighter rate window before actually locking into play speed
            if
            (
                (
                    newRate > 1.0 - kRateTolerance / 8 &&
                    newRate < 1.0 + kRateTolerance / 8 &&
                    error < kMaxUnityError / 8
                )
            )
                mUnityRateTimer++;
        }
        else
            newRate = 1.0;
    }
    else if
    (
        newRate < -1.0 + kRateTolerance &&
        newRate > -1.0 - kRateTolerance &&
        error < kMaxUnityError
    )
    {
        if (reverseSyncLockDelay == INFINITE_SYNCLOCK_DELAY)
            mUnityRateTimer = 0;
        else if (mUnityRateTimer > reverseSyncLockDelay)
        {
            // Use a tighter rate window before actually locking into reverse play speed
            if
            (
                (
                    newRate < -1.0 + kRateTolerance / 8 &&
                    newRate > -1.0 - kRateTolerance / 8 &&
                    error < kMaxUnityError / 8
                )
            )
                mUnityRateTimer--;
        }
        else
            newRate = -1.0;
    }
    else
        mUnityRateTimer = 0;
```

```
#ifdef _TRACE_OUTPUT_DELTA
    static SyFilterPipeItem lastFilterPoint;
    SYRELTRACE
    (
        _T("FPD:  F=%I64d  S=%I64d\n"),
        newFilterPoint.mFrame - lastFilterPoint.mFrame,
        newFilterPoint.mSample - lastFilterPoint.mSample
    );
    SYRELTRACE
    (
        _T("FRD:  F=%I64d  S=%I64d\n"),
        newFilterPoint.mRate.mFrame - lastFilterPoint.mRate.mFrame,
        newFilterPoint.mRate.mSample - lastFilterPoint.mRate.mSample
    );
    lastFilterPoint = newFilterPoint;
#endif
#if defined(_DEBUG) || defined(NDEBUG)
//#define _TRACE
#ifdef _TRACE
    SYRELTRACE
    (
        _T("CT:  fp=%I64u,%I64u  fr=%I64d,%I64d  curRate=%f  newRate=%f  pos=%I64d  rateTS=%lu  cmdTS=%lu\
 n"),
        newFilterPoint.mFrame,
        newFilterPoint.mSample,
        newFilterPoint.mRate.mFrame,
        newFilterPoint.mRate.mSample,
        currentRate,
        newRate,
        position,
        rateTimeStamp,
        commandTimeStamp
    );
    SYRELTRACE
    (
        _T("    actPos=%lf  desPos=%I64u  error=%s%I64d  depth=%d  curPos=%d\n"),
        mActualPosition,
        desiredPosition,
        position > desiredPosition ? _T("-") : _T(""),
        error,
        newFilterPoint.mDepth,
        newFilterPoint.mPosition
    );
#endif
#endif
    // If the error is more than kMaxChaseError and the rate is maxed out, cue the transport
    if
    (
        error > kMaxChaseError && SY::abs(newRate) == kMaxRate
        ||
        this->CueHint(currentRate) & ~mCueHint
    )
    {
        mCueHint = this->CueHint(currentRate);
        TimeStamp cueDelay = this->GetCueDelay() << (int) (mCueHint == CUEHINT_BIDIRECTIONAL);
        if ((Int32)cueDelay < newFilterPoint.mRate.mSample)
            cueDelay = newFilterPoint.mRate.mSample;
        mCueTimeStamp = commandTimeStamp + cueDelay;
        newRate = 0.0;
        if (newRate != mLastActualRate)
            this->SetTransportRate(newRate, commandTimeStamp);
//SYTRACE(_T("nfp.mFrame: %I64d, cr: %f, cts: %d, nfp.mSample: %I64d\n"),
// newFilterPoint.mFrame, (float) currentRate, (Int32) mCueTimeStamp,
// newFilterPoint.mSample);
        position = newFilterPoint.mFrame + (TimeCode)(currentRate * (mCueTimeStamp - (TimeStamp)newFilterP
 oint.mSample));
        if (SY::abs(currentRate) <= kMaxRate)
            this->CueTransport(position, commandTimeStamp, mCueHint);
        else
        {
            // The following call to Cue used to be called to handle the case
            // where CalculateRate wasn't called for a long time.  However,
            // it could cause the rate controller to get out of sync with
            // the transports it is controlling.
            // Set position just to keep mActualPosition and mLastActualRateTimeStamp reasonable
            //this->Cue(position, commandTimeStamp);

// Clear mCueHint to force a cue before any new rates are sent
            mCueHint = 0;
        }
        mCuePosition = position;
    }
    // Otherwise, if we're not cueing, set the transport rate
    else if ((TimeStamp)(commandTimeStamp + (TimeStamp)newFilterPoint.mRate.mSample) >= mCueTimeStamp)
```

```
    {
        Bool32 lock
            =
            (
                mUnityRateTimer == forwardSyncLockDelay || mUnityRateTimer == reverseSyncLockDelay
            )
            &&
            SY::abs(newRate) >= 1.0;
        if (newRate != mLastActualRate || lock != mLastActualLock)
            this->SetTransportRate(newRate, rateTimeStamp, lock);
        mCueTimeStamp = rateTimeStamp;
        if (mCueHint != CUEHINT_BIDIRECTIONAL)
        {
            Int32 cueDelay = this->GetCueDelay();
            if (position >= mCuePosition + cueDelay)
                mCueHint |= CUEHINT_BACKWARD;
            else if (position <= mCuePosition - cueDelay)
                mCueHint |= CUEHINT_FORWARD;
        }
    }
} void SyNewRateControl::SetRate(IEEE32 rate, TimeStamp timeStamp, Bool32 lock)
{
    ::SyEnterCriticalSection(&mTransportCS);
    mActualPosition += mLastActualRate * (timeStamp - mLastActualRateTimeStamp);
    //SYTRACE(_T("SR MAP %f\n"), (float) mActualPosition);
    mLastActualRate = rate;
    mLastActualRateTimeStamp = timeStamp;
    mLastActualLock = lock;
    ::SyLeaveCriticalSection(&mTransportCS);
#ifdef _TRACE
    TimeStamp cur = this->GetReferenceTime();
    SYRELTRACE(_T("SetRate(%f, %lu, %d), cur=%lu, delta=%ld\n"), rate, timeStamp, lock, cur, timeStamp - cur);
#endif
} void SyNewRateControl::Cue(TimeCode time, TimeStamp timeStamp)
{
    ::SyEnterCriticalSection(&mTransportCS);
    mActualPosition = time;
    //SYTRACE(_T("Cue MAP: %f\n"), (float) mActualPosition);
    mLastActualRateTimeStamp = timeStamp;
    ::SyLeaveCriticalSection(&mTransportCS);
#ifdef _TRACE
    TimeStamp cur = this->GetReferenceTime();
    SYRELTRACE(_T("Cue(%I64d, %lu), cur=%lu, delta=%ld\n"), time, timeStamp, cur, timeStamp - cur);
#endif
} void SyNewRateControl::UpdateForwardSyncLockDelay(UInt32 forwardSyncLockDelay)
{
    if (forwardSyncLockDelay == INFINITE)
        mForwardSyncLockDelay = INFINITE_SYNCLOCK_DELAY;
    else
    {
        UInt32 syncLockDelay = (forwardSyncLockDelay + (kFrameSamplePeriod * kDecimate >> 1)) / (kFrameSam
            plePeriod * kDecimate);
        mForwardSyncLockDelay = syncLockDelay > 0x7FFF ? 0x7FFF : syncLockDelay;
    }
#ifdef _TRACE
    SYRELTRACE(_T("mForwardSyncLockDelay set to %d\n"), mForwardSyncLockDelay);
#endif
} void SyNewRateControl::UpdateReverseSyncLockDelay(UInt32 reverseSyncLockDelay)
{
    if (reverseSyncLockDelay == INFINITE)
        mReverseSyncLockDelay = INFINITE_SYNCLOCK_DELAY;
    else
    {
        UInt32 syncLockDelay = (reverseSyncLockDelay + (kFrameSamplePeriod * kDecimate >> 1)) / (kFrameSam
            plePeriod * kDecimate);
        mReverseSyncLockDelay = syncLockDelay > 0x7FFF ? -0x7FFF : -syncLockDelay;
    }
#ifdef _TRACE
    SYRELTRACE(_T("mReverseSyncLockDelay set to %d\n"), mReverseSyncLockDelay);
#endif
} void SyNewRateControl::UpdateForwardFilterLength(UInt32 minForwardFilterLength)
{
    UInt32 twoToTheMinFilterDepthMinusTwo = (mFrameUpdatePeriod + minForwardFilterLength) / kFrameSampleP
        eriod;
```

```
for
(
    UInt16 minForwardFilterDepth = 1;   // For thread protection, use a local variable while calculati
        ng filter depth
    twoToTheMinFilterDepthMinusTwo != 0 && minForwardFilterDepth < kMaxFilterDepth;
    twoToTheMinFilterDepthMinusTwo >>= 1, minForwardFilterDepth++
)
;
mMinForwardFilterDepth = minForwardFilterDepth > kMaxFilterDepth ? kMaxFilterDepth : minForwardFilter
        Depth;
#ifdef _TRACE
    SYRELTRACE(_T("mMinForwardFilterDepth set to %d\n"), mMinForwardFilterDepth);
#endif
} void SyNewRateControl::UpdateReverseFilterLength(UInt32 minReverseFilterLength)
{
    UInt32 twoToTheMinFilterDepthMinusTwo = (mFrameUpdatePeriod + minReverseFilterLength) / kFrameSampleP
        eriod;
    for
    (
        UInt16 minReverseFilterDepth = 1;   // For thread protection, use a local variable while calculati
            ng filter depth
        twoToTheMinFilterDepthMinusTwo != 0 && minReverseFilterDepth < kMaxFilterDepth;
        twoToTheMinFilterDepthMinusTwo >>= 1, minReverseFilterDepth++
    )
    ;
    mMinReverseFilterDepth = minReverseFilterDepth > kMaxFilterDepth ? kMaxFilterDepth : minReverseFilter
        Depth;
#ifdef _TRACE
    SYRELTRACE(_T("mMinReverseFilterDepth set to %d\n"), mMinReverseFilterDepth);
#endif
}

SyNewRateControl::FilterPipe::FilterPipe(UInt32 length) :
    SySigPipe<SyFilterPipeItem>
    (
        length,
        new SyNullMutex,
        new SyNullMutex,
        new SySemaphoreSemaphore(length, length),
        new SySemaphoreSemaphore(0, length)
    )
{
}

SyNewRateControl::FilterPipe::~FilterPipe(void)
{
    delete this->EmptySemaphore();
    delete this->FullSemaphore();
    delete this->SinkMutex();
    delete this->SourceMutex();
}
```

What is claimed is:

1. A system for processing audio samples, comprising:

a circular buffer for storing a plurality of the audio samples during iteration of the processing system, wherein a plurality of audio samples comprise an address, the length of the buffer comprises a multiple of the length of an address, the buffer includes first and second opposed ends, and an audio sample is added to multiple positions in the buffer upon each iteration of the processing system, the address moves through the buffer between iterations of the processing system, and an audio sample is removed from multiple positions in the buffer after a plurality of iterations of the processing system;

means for adding an audio sample to multiple positions in the buffer upon each iteration of the processing system;

means for moving the address through the buffer between iterations of the processing system; and means for removing an audio sample from multiple positions in the buffer after each iteration of the processing system.

2. The buffer of claim 1, wherein the plurality of audio samples which comprise an address comprise N audio samples.

3. The buffer of claim 1, wherein the multiple positions comprise two positions.

4. The system of claim 1, further comprising means for controlling the motion of an audio transport responsive to an audio input from the motion of an audio source and an audio output to the audio transport derived from the audio input, wherein the motion of the audio source generates the audio samples for the circular buffer.

5. The buffer of claim 2, wherein the length of the buffer comprises 2N, and the multiple positions comprise two positions spaced N audio samples apart.

6. A method of processing audio samples, in a system for processing audio samples comprising a circular buffer for storing a plurality of the audio samples during iteration of the processing system, wherein a plurality of audio samples comprise an address, the length of the buffer comprises a multiple of the length of an address, the buffer includes first and second opposed ends, and an audio sample is added to multiple positions in the buffer upon each iteration of the processing system, the address moves through the buffer between iterations of the processing system, and an audio sample is removed from multiple positions in the buffer after each iteration of the processing system; means for adding an audio sample to multiple positions in the buffer upon each iteration of the processing system, means for moving the address through the buffer between iterations of the processing system; and means for removing an audio sample from multiple positions in the buffer after each iteration of the processing system, the method comprising the steps of:

activating an audio input to generate the audio samples;

activating the adding means to add an audio sample to multiple positions in the buffer upon each iteration of the processing system;

activating the moving means to move the address through the buffer between iterations of the processing system; and activating the removing means to remove a sample from multiple positions in the buffer after each iteration of the processing system.

7. The method of claim 6, wherein the plurality of audio samples which comprise an address comprise N audio samples, the step of activating the adding means comprises adding audio samples to the buffer, and the step of activating the removing means comprise removing audio samples such that N audio samples are stored in the buffer.

8. The method of claim 7, wherein the length of the buffer comprises 2N, and the multiple positions comprise two positions spaced N audio samples apart, and the step of activating the adding means comprises adding each audio sample into the circular buffer at two positions spaced N audio samples apart.

9. The method of claim 6, wherein the multiple positions comprise two positions, and the steps of activating the adding means comprises adding audio samples at two positions.

10. The method of claim 6, wherein the system further comprises means for controlling the motion of an audio transport responsive to an audio input from the motion of an audio source and an audio output to the audio transport derived from the audio input, wherein the motion of the audio source generates the audio samples for the circular buffer, further comprising the steps of controlling the motion of the audio transport responsive to the audio input and audio output.

* * * * *

UNITED STATES PATENT AND TRADEMARK OFFICE
CERTIFICATE OF CORRECTION

PATENT NO.     : 6,044,434
DATED          : March 28, 2000
INVENTOR(S)    : Richard J. Oliver Page 1 of 1

It is certified that error appears in the above-identified patent and that said Letters Patent is hereby corrected as shown below:

<u>Column 4,</u>
Line 14, after "check", insert -- for --.

Signed and Sealed this

Sixteenth Day of October, 2001

*Attest:*

*Attesting Officer*

NICHOLAS P. GODICI
*Acting Director of the United States Patent and Trademark Office*